United States Patent Office 3,162,627
Patented Dec. 22, 1964

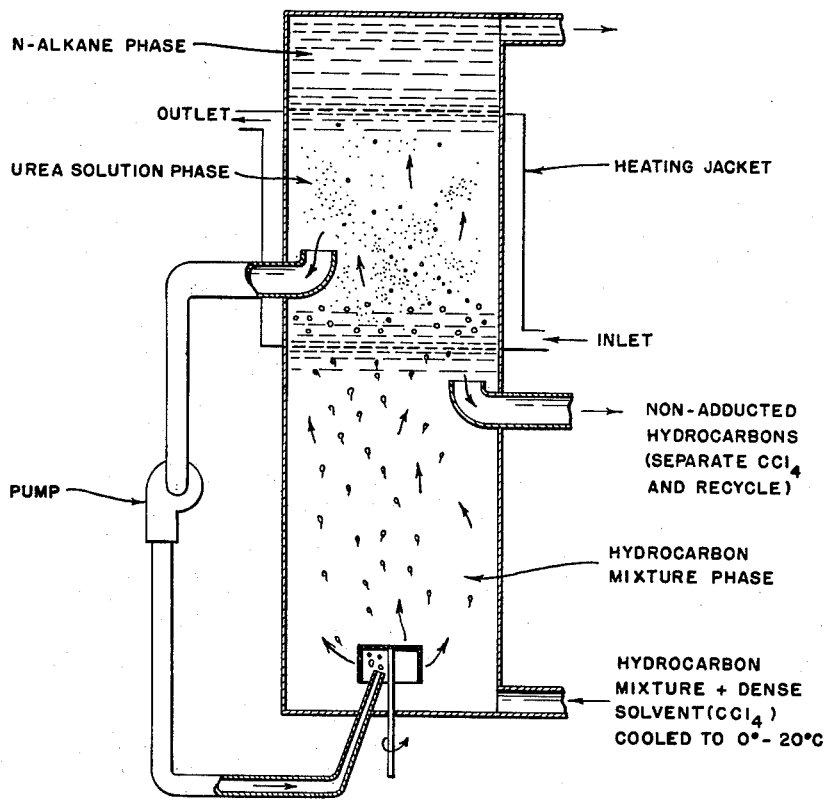

3,162,627
PROCESS FOR THE SEPARATION AND PURIFICATION OF N-ALKANES FROM HYDROCARBON MIXTURES
James L. Callahan, Bedford, and Joseph J. Szabo, Chagrin Falls, Ohio, assignors to The Standard Oil Company, Cleveland, Ohio, a corporation of Ohio
Filed Dec. 29, 1960, Ser. No. 79,224
3 Claims. (Cl. 260—96.5)

This invention relates to a continuous process and the apparatus for the separation and purification of n-alkanes from complex hydrocarbon mixtures by forming solid urea adducts.

A further object of this invention is to simplify the apparatus so that the entire process can be done in a single column and separate mixing and stripping vessels, and filtration and centrifuging operations of the prior art are eliminated.

The apparatus is illustrated. It consists of a single column in which the various components stratify. At the bottom of the column there is an inlet for the hydrocarbon mixture and the dense solvent. Resting on this phase is the urea solvent phase which is encased by a heating jacket. From this phase and above the midpoint of the column there is an outlet to pump the urea solution down to the center bottom of the column. On the opposite side of the column is the outlet for the dense solvent-nonreacted hydrocarbon mixture from which the n-alkanes have been removed. At the top of the column is the outlet for the n-alkanes.

The complex hydrocarbon mixture and a dense solvent such as carbon tetrachloride are introduced at the bottom of the column. Supported on this phase is the second phase of the urea and alcohol, or water, or water and alcohol which is pumped to the bottom of the column and introduced as a spray into the hydrocarbon phase which is maintained at a temperature favorable to urea adduction. As the urea solution droplets rise through the dense solvent-hydrocarbon mixture they extract the n-alkanes and urea adducts which pass through the interface to the upper phase of the urea solution. This phase is maintained at a urea concentration and a temperature that favors decomposition of the urea adduct.

The unreacted hydrocarbon and dense solvent are drawn off below the urea phase and the dense solvent is separated and recycled. The heat from a steam jacket around the urea phase decomposes the urea adduct, and the freed n-alkanes rise to the top of the urea phase and are drawn off. The intermediate phase of urea solution is pumped back to the bottom of the reactor.

This process may be used for any hydrocarbon mixture that has a molecular weight above n-heptane. However, there are certain critical conditions. The solvent for the hydrocarbon phase must be sufficiently dense so that the density of the hydrocarbon phase is greater than that of the urea solution and of the urea adduct. The solvent must be miscible with all the different hydrocarbons found in the hydrocarbon mixture. It must be easily separated by distillation from a hydrocarbon mixture. It should be unable to form an adduct with urea and it must be substantially insoluble in aqueous or alcoholic-urea solutions. Suitable solvents are carbon tetrachloride, chloroform, and tetrachloroethylene.

The density of the urea solution should be greater than that of the n-alkanes liberated from the adduct in order that the extracted n-alkanes form the uppermost phase. The density can be adjusted by altering the ratio of water and methanol. The urea adduct is decomposed in the phase and the concentration of the urea solution should be below saturation, because a saturated solution stabilizes the adduct. Concentration in the range of 25 to 65 grams of urea per 100 grams of solvent are recommended. The volume of the urea solution relative to the volume of hydrocarbon treated should be in the range of one-half to three volumes of urea solution per volume of hydrocarbon contacted.

For adduct formation the temperature of the lower hydrocarbon phase should be as low as possible. Operative temperatures are in the range of 0° to 25° C.

Decomposition temperature depends on the molecular weight of the hydrocarbon component of the adduct as well as the solvent system used. The greater the molecular weight of the n-alkanes, the more stable is the adduct. The degree of adduct solubility in the solvent is critical to the decomposition temperature. Temperatures in the range of 60° to 80° C. are operable for a methanol-water system.

Example I

Seventy milliliters of a hydrocarbon mixture consisting of 27% cetane and 73% isooctane by weight were dissolved in 130 ml. of carbon tetrachloride, 380 ml. of methanol containing 170 grams of urea were bubbled through the hydrocarbon-carbon tetrachloride mixture at 20° C. for 10 minutes. The urea adduct slurry rose to the urea-methanol phase and was heated to 70° C. to decompose the adduct. The hydrocarbon recovered contained 70% cetane.

Example II

Seventy milliliters of a Toledo naphtha (318–440° F. boiling range) containing 26% n-alkanes were dissolved in 130 ml. of tetrachloroethylene, 350 ml. of methanol containing 150 grams of urea were bubbled through the hydrocarbon-solvent mixture at a temperature of 15° C. for 10 minutes. The urea-adduct slurry rose to the urea methanol phase and was heated to 65° C. to decompose the adduct. The hydrocarbon recovered was 65% n-alkane.

Various other modifications in the apparatus and method of this invention will be apparent to one skilled in the art without departing from the scope of the invention.

We claim:
1. A process for separating urea adductable n-alkanes from a mixture of hydrocarbons by urea adduction using a single 3-phase columnar processing zone comprising a dense solvent hydrocarbon mixture phase, an intermediate urea solution phase, and an upper n-alkane phase, which process comprises the steps of introducing into said lower phase a mixture of hydrocarbons dissolved in a dense solvent selected from the group consisting of carbon tetrachloride, chloroform, and tetrachloroethylene, pumping the urea solution from the intermediate phase into the lower phase, dispersing the urea solution as droplets through the dense solvent-hydrocarbon mixture, whereby the n-alkanes are extracted by urea adduction, forming the urea adduct slurry that rises into the urea solution phase, decomposing continuously the adduct by heat in the urea solution phase to free the n-alkanes and drawing the n-alkanes off as the upper third phase.

2. The process of claim 1 wherein the nonreacted hydrocarbon and dense solvent are recovered.

3. The process of claim 1 wherein in which the dense solvent recovered from the nonreacted hydrocarbon mixture and the urea solution are recycled.

References Cited in the file of this patent

UNITED STATES PATENTS

| | | |
|---|---|---|
| 2,637,681 | Arnold et al. | May 5, 1953 |
| 2,640,051 | Lynch | May 26, 1953 |
| 2,681,302 | Gorin | June 15, 1954 |
| 2,681,332 | Gorin | June 15, 1954 |
| 2,714,586 | Lynch | Aug. 2, 1955 |
| 2,809,961 | Callahan | Oct. 15, 1957 |
| 2,991,221 | Bryant et al. | July 4, 1961 |